United States Patent [19]
Schoner et al.

[11] Patent Number: 6,072,548
[45] Date of Patent: *Jun. 6, 2000

[54] VIDEO DECODER DYNAMIC MEMORY ALLOCATION SYSTEM AND METHOD ALLOWING VARIABLE DECODED IMAGE SIZE

[75] Inventors: Brian Schoner, Fremont; Darren Neuman, San Jose, both of Calif.

[73] Assignee: LSI Logic Corporation, Milpitas, Calif.

[*] Notice: This patent is subject to a terminal disclaimer.

[21] Appl. No.: 08/901,580

[22] Filed: Jul. 28, 1997

[51] Int. Cl.$^7$ ........................................ H04N 4/00
[52] U.S. Cl. ........................... 348/845; 382/232; 395/166
[58] Field of Search ................................... 348/385, 386, 348/387, 390, 394, 412, 423, 441, 443, 845, 845.1, 845.2, 845.3, 714, 715, 717, 513; 382/232; 395/166, 800.01, 450; H04N 7/00

[56] References Cited

U.S. PATENT DOCUMENTS

| | | | |
|---|---|---|---|
| 5,517,612 | 5/1996 | Dwin et al. | 395/166 |
| 5,638,531 | 6/1997 | Crump et al. | 395/450 |
| 5,717,461 | 2/1998 | Hoogenboom | 348/394 |
| 5,781,788 | 7/1998 | Woo et al. | 395/800.01 |
| 5,838,380 | 10/1998 | Sun et al. | 348/412 |
| 5,841,472 | 10/1998 | Rim et al. | 348/390 |

*Primary Examiner*—Howard Britton
*Assistant Examiner*—Tung Vo
*Attorney, Agent, or Firm*—Conley, Rose & Tayon, PC; B. Noel Kivlin

[57] ABSTRACT

A video decoder which uses a dynamic memory allocation scheme having end-of-frame (EOF) tokens for decoder-display synchronization. The EOF tokens advantageously allow for decoding and display of variable-sized images with a fixed dynamic memory allocation architecture. In one embodiment, the video decoder includes an MPEG bitstream decoder, FIFO buffer logic, a free segment register, and a display processor. The video decoder decodes an encoded bitstream to obtain image data for storage in an external memory, and the display processor retrieves the image data for display on a fixed-size monitor. To conserve memory, the bitstream decoder only stores anchor frames as complete images in the external memory, and bi-directional images are stored in dynamically allocated memory segments. Free memory segments are determined by examination of a free segment register, and pointers to the memory segments having image data are passed to the display processor via the FIFO buffers. The display processor is unable to compensate for differences between the decoded image size and the displayed image size for image data passed using the dynamic memory allocation scheme unless some method for marking the end of decoded image fields is used. The bitstream decoder accomplishes this by writing end-of-field tokens to the FIFO buffers to delineate the image data.

10 Claims, 4 Drawing Sheets

VIDEO DECODER DYNAMIC MEMORY ALLOCATION SYSTEM AND METHOD ALLOWING VARIABLE DECODED IMAGE SIZE

BACKGROUND OF THE INVENTION

1. Field of the Invention

This invention generally relates to the field of digital video compression, and more particularly to a digital video decoder with improved use of dynamic memory allocation.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e. if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I (intra) frames contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, P frames receive a fairly high amount of compression and are used as references for future P frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame, i.e., a frame being encoded, the encoder searches for a best fit or best match between the target picture macroblock and a block in a neighboring picture, referred to as a search frame. For a target P frame, the encoder searches in a prior I or P frame. For a target B frame, the encoder searches in a prior and subsequent I or P frame. When a best match is found, the encoder transmits a vector movement code or motion vector. The vector movement code or motion vector includes a pointer to the best fit search frame block as well as information on the difference between the best fit block and the respective target block. The blocks in target pictures that have no change relative to the block in the reference or search frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into four sub-blocks, seeking out changes in color and brightness. Human perception is more sensitive to brightness changes than color changes. Thus the MPEG algorithm devotes more effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks and respective sub-blocks, and each block is transformed via the discrete cosine transform (DCT).

After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Zero run length encoding is used to transmit the quantized values. To further enhance compression, the blocks are scanned in a zig-zag ordering that scans the lower frequency entries first, and the non-zero quantized values, along with the zero run lengths, are entropy encoded.

Because of the picture dependencies, i.e., the temporal compression, the order in which the frames are transmitted, stored, or retrieved, is not necessarily the display order, but rather an order required by the decoder to properly decode the pictures in the bitstream. For example, a typical sequence of frames, in display order, might be shown as follows:

objects or blocks in successive frames is their position in the frame as a result of motion (either due to object motion, camera motion or both). The key to this relative encoding is motion estimation. In general, motion estimation is an essential processing requirement in most video compression algorithms. In general, motion estimation is the task of identifying temporal redundancy between frames of the video sequence.

The video decoding process is generally the inverse of the video encoding process and is employed to reconstruct a motion picture sequence from a compressed and encoded bitstream. The data in the bitstream is decoded according to a syntax that is defined by the data compression algorithm. The decoder must first identify the beginning of a coded picture, identify the type of picture, then decode each individual macroblock within a particular picture.

When encoded video data is transferred to a video decoder, the encoded video data is received and stored in a rate or channel buffer. The data is then retrieved from the channel buffer by a decoder or reconstruction device for performing the decoding process. When the MPEG decoder receives the encoded stream, the MPEG decoder reverses the above operations. Thus the MPEG decoder performs inverse scanning to remove the zig zag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

When frames are received which are used as references for other frames, such as I or P frames, these frames are decoded and stored in memory. When a reconstructed frame is a reference or anchor frame, such as an I or a P frame, the reconstructed frame replaces the oldest stored anchor frame and is used as the new anchor for subsequent frames.

When a temporally compressed or encoded frame is received, such as a P or B frame, motion compensation is performed on the frame using the neighboring decoded I or P reference frames, also called anchor frames. The temporally compressed or encoded frame, referred to as a target frame, will include motion vectors which reference blocks in neighboring decoded I or P frames stored in the memory. The MPEG decoder examines the motion vector, determines the respective reference block in the reference frame, and accesses the reference block pointed to by the motion vector from the memory.

| I | B | B | P | B | B | P | B | B | P | B | B | I | B | B | P | B | B | P |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |

By contrast, the bitstream order corresponding to the given display order would be as follows:

In order to reconstruct a B frame, the two related anchor frames or reference frames must be decoded and available in

| I | P | B | B | P | B | B | P | B | B | I | B | B | P | B | B | P | B | B |
|---|---|---|---|---|---|---|---|---|---|---|---|---|---|---|---|---|---|---|
| 0 | 3 | 1 | 2 | 6 | 4 | 5 | 9 | 7 | 8 | 12 | 10 | 11 | 15 | 13 | 14 | 18 | 16 | 17 |

Because the B frame depends on a subsequent I or P frame in display order, the I or P frame must be transmitted and decoded before the dependent B frame.

As discussed above, temporal compression makes use of the fact that most of the objects remain the same between consecutive picture frames, and the difference between a memory, referred to as the picture buffer. This is necessary since the B frame was encoded relative to these two anchor frames. Thus the B frame must be interpolated or reconstructed using both anchor frames during the reconstruction process.

After all of the macroblocks have been processed by the decoder, the picture reconstruction is complete. The resultant coefficient data is then inverse quantized and operated on by an IDCT process to transform the macroblock data from the frequency domain to data in the time and space domain. As noted above, the frames may also need to be re-ordered before they are displayed in accordance with their display order instead of their coding order. After the frames are re-ordered, they may then be displayed on an appropriate display device.

As described above, as the encoded video data is decoded, the decoded data is stored into a picture store buffer. In some configurations, the channel and picture buffers are incorporated into a single integrated memory buffer. The decoded data is in the form of decompressed or decoded I, P or B frames. A display processor retrieves the picture data for display by an appropriate display device, such as a TV monitor or the like.

A television picture is typically comprised of two fields, referred to as the top and bottom field. The top field contains every other scan line in the picture beginning with the first scan line. The bottom field contains every other line beginning with the second line. In other words, the top field comprises the odd horizontal scan lines, and the bottom field comprises the even horizontal scan lines. A television scans or draws all the top field lines, followed by all the bottom field lines, in an interlaced fashion. A picture encoded using the MPEG2 coding standard may be encoded in either a progressive or interlaced format, referred to as a frame picture structure or field picture structure, respectively.

The amount of memory is a major cost item in the production of video decoders. Thus, it is desired to reduce the memory requirements of the decoder system as much as possible to reduce its size and cost. However, any technique used to reduce the memory requirements needs to be robust, i.e., it should function for various picture sizes and decoding rates, and it should provide some graceful error recovery method. Further, a method of freezing the display without requiring additional memory is desirable.

SUMMARY OF THE INVENTION

The problems outlined above are in large part solved by a video decoder which uses a dynamic memory allocation scheme having end-of-frame (EOF) tokens for decoder-display synchronization. The EOF tokens advantageously allow for decoding and display of variable-sized images with a fixed dynamic memory allocation architecture. In one embodiment, the video decoder includes an MPEG bitstream decoder, FIFO buffer logic, a free segment register, and a display processor. The video decoder decodes an encoded bitstream to obtain image data for storage in an external memory, and the display processor retrieves the image data for display on a fixed-size monitor. To conserve memory, the bitstream decoder only stores anchor frames as complete images in the external memory, and bi-directional images are stored in dynamically allocated memory segments. Free memory segments are determined by examination of a free segment register, and pointers to the memory segments having image data are passed to the display processor via the FIFO buffers. The display processor is unable to compensate for differences between the decoded image size and the displayed image size for image data passed using the dynamic memory allocation scheme unless some method for marking the end of decoded image fields is used. The bitstream decoder accomplishes this by writing end-of-field tokens to the FIFO buffers to delineate the image data.

Broadly speaking, the present invention contemplates a video decoder comprising a segment register, a bitstream decoder, a FIFO buffer, and a display processor. The segment register is configured to indicate de-allocated memory segments. The bitstream decoder is coupled to the segment register to determine target memory segments, configured to receive a bitstream, convert it into image data, and write the image data into the target memory segments. The FIFO buffer is coupled to the bitstream decoder to receive pointers to the target memory segments. The display processor is coupled to retrieve the pointers from the FIFO buffer, configured to read the image data from the target memory segments, and configured to convert the image data into a stream of pixel data. The display processor is also coupled to the segment register to de-allocate target memory segments. The bitstream decoder is configured to provide an EOF (end-of-field) token to the FIFO buffer to mark an end to the image data for a field.

The present invention further contemplates a method for displaying an image having a first image height on a monitor having a second image height, wherein the method comprises a video decoder performing the steps of (1) accessing a segment register to determine a target memory segment; (2) storing image data in the target memory segment; (3) providing a pointer to the target memory segment to a buffer; and (4) placing an end-of-field token in said buffer if said image data completes the image.

BRIEF DESCRIPTION OF THE DRAWINGS

Other objects and advantages of the invention will become apparent upon reading the following detailed description and upon reference to the accompanying drawings in which.

Figure 1:
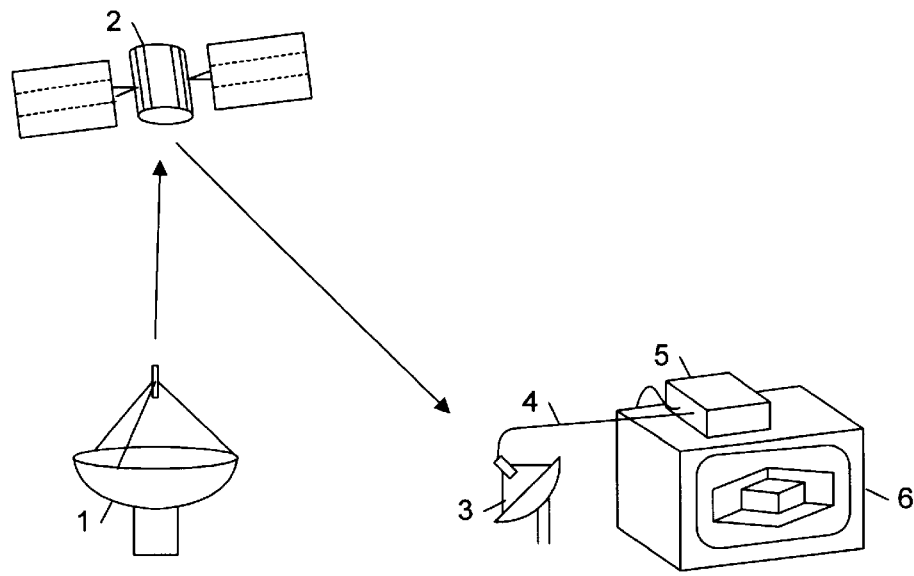
FIG. 1 illustrates a digital broadcast satellite system including a set top box with a video decoder.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 shows a digital broadcast satellite system having a base station 1 which transmits a digital broadcast signal to a satellite 2, which in turn re-transmits it to a receiver dish 3. A sensor on receiver dish 3 converts the digital broadcast signal into an electrical receive signal which is transported by a cable 4 to a set top box 5. The set top box 5 converts the receive signal into raster signal for a monitor 6, which displays the image represented by the receive signal. Set top box 5 includes a tuner, a channel demodulator/decoder, a video decoder, a memory, and a rasterizer. The video decoder features a dynamic memory allocation architecture.

Figure 2:
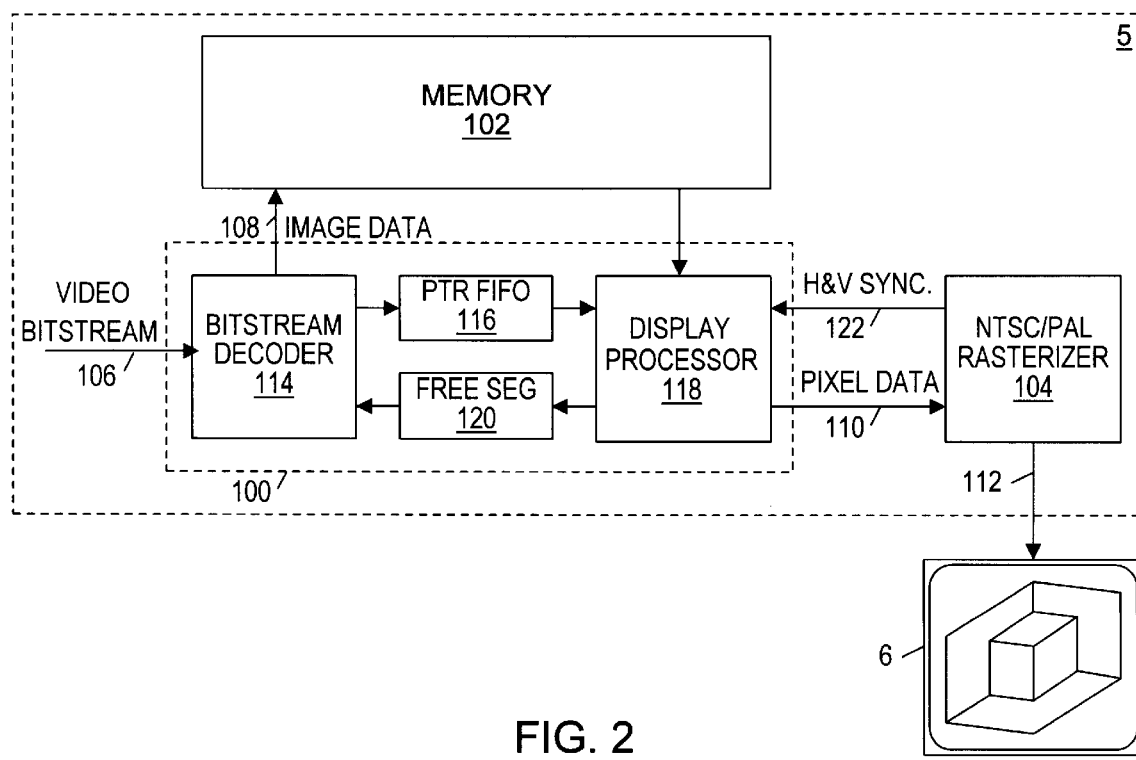
FIG. 2 provides a functional block diagram of a video decoder.

Turning to FIG. 2, set top box 5 is shown having a video decoder 100, a memory 102, and a rasterizer 104. A tuner (not shown) converts the receive signal into a baseband signal which is demodulated and error corrected by a channel demodulator/decoder (not shown). The video decoder 100 is coupled to receive a video bitstream 106 from the channel demodulator/decoder. The video decoder 100 converts the video bitstream 106 into image data 108 which is stored in memory 102. The video decoder 100 processes the image data 108 to form a stream of pixel data 110. The rasterizer 104 is coupled to receive the stream of pixel data 110 from the video decoder 100. The rasterizer 104 converts the pixel data 110 into a display signal 112 which is provided to monitor 6 for display.

In one embodiment, the video decoder 100 operates to perform MPEG decoding to produce a decoded or decompressed signal. As discussed further below, the video decoder 100 operates to decode bi-directionally predictive-coded (B) frames of pixel data with reduced memory requirements, improved synchronization, and improved error-recovery according to the present invention.

The MPEG video decoder 100 performs motion compensation and frame reconstruction with reduced memory requirements. As shown, the video decoder 100 receives an encoded or compressed digital video bitstream 106 and outputs an uncompressed digital video pixel data stream 110. The compressed digital video bitstream 106 is a bitstream of compressed video data which is used to present a video sequence, such as a television segment or movie, onto a monitor 6, such as a television or a computer system. In the preferred embodiment, the compressed digital video stream is compressed using the MPEG-2 compression algorithm, and the video decoder 100 is thus preferably an MPEG-2 decoder. Since the operation of MPEG decoders is well known in the art, details of their operation which are not necessary to the operation of the present invention are omitted for simplicity.

The video decoder 100 decodes the picture data to a form appropriate for display. The video decoder 100 incorporates decoder functions for translating the encoded video data into corresponding pixel data for display. For example, the video decoder may include an inverse discrete cosine transform (IDCT) pipeline, a motion compensation (MC) pipeline and a merge and store unit for executing the reconstruction process. The IDCT pipeline coordinates the reconstruction of each macroblock of a frame, and the MC pipeline processes any motion compensation information with respect to each macroblock.

As shown, an external memory 102, also referred to as a picture buffer, is coupled to the video decoder 100. The video decoder 100 utilizes the memory 102 in the MPEG decode process. The video decoder 100 uses the memory 102 to store decoded MPEG streams which are used during motion compensation or reconstruction of temporally compressed frames. According to the present invention, the video decoder 100 uses the memory 102 to store reference or anchor frames, as well as macroblock row portions of B frames. The reference frames of video data are used in performing motion compensation on temporally compressed frames, such as P and B frames. In general, an MPEG stream includes encoded reference frame data which is transmitted before temporally compressed data that depends on the prior transmitted reference frame data. Thus, incoming temporally encoded frame data, such as P and B frame data, comprises motion vectors which point to reference blocks in a prior transmitted reference frame of video data, which has been stored in the memory 102. The motion compensation pipeline of video decoder 100 analyzes each motion vector from the incoming temporally compressed data and retrieves a reference block from the memory 102 in response to each motion vector. The motion compensation pipeline then uses this retrieved reference block to decompress the temporally compressed data.

The video decoder 100 translates video bitstream 106 into pixel data 110 using as little of memory 102 as possible. This advantageously allows for the construction of a more inexpensive system since less memory is required. The embodiment illustrated in FIG. 2 accomplishes this using dynamic memory allocation. Video decoder 100 includes a bitstream decoder 114, a pointer first-in-first-out (FIFO) buffer 116, a display processor 118, and a free segment register 120. Bitstream decoder 114 receives video bitstream 106 and decompresses (using the IDCT and MC pipelines) it to form image data 108. Bitstream decoder 114 stores the image data 108 in memory 102. Display processor 118 reads the image data 108 from memory 102 and transmits pixel data 110 to rasterizer 104 in response to horizontal and vertical synchronization signals 122 provided from rasterizer 104. The rasterizer 104 operates to convert the digital video pixel data stream into a format more appropriate for transmission or display, such as UHF or VHF format. The rasterizer logic includes digital to analog (D/A) converters for converting the decoded digital video stream into an analog video signal 112. This analog video signal 112 is then provided as an output of set top box 5 as shown.

For image data 108 stored in segments in memory 102 using dynamic memory allocation, bitstream decoder 114 first determines an available memory segment by examining segment register 120, stores data in the target memory segment, then provides pointers to the memory segments to buffer 116. Display processor 118 retrieves pointers from buffer 116, reads image data stored in the corresponding segments in memory 102, and writes to segment register 120 to de-allocate the memory segments once the image data is no longer needed.

Memory 102 includes three regions, two regions for storing anchor frames, and a third region for dynamic memory allocation for bi-directional (B) frames. In the MPEG decoding process, the bitstream decoder first decodes an intermediate (I) frame and stores it in one of the anchor frame storage regions of memory 102. The bitstream decoder next decodes a predicted (P) frame and stores it in the second of the anchor frame storage regions. Future I and P frames are stored in the anchor frame region having the oldest image data. To save memory, the third region of memory is too small to store a complete image frame. Instead, B frames are stored a macro-block row at a time into segments of the third region of memory 102.

MPEG images are encoded using base units called macroblocks. A macro-block is a group of six 8×8 pixel blocks. A 16×16 square of four 8×8 luminance blocks is combined with two sub-sampled 8×8 chrominance blocks (one red chrominance and one blue chrominance) to form a macroblock. The brightness and color information of a 16×16 block of pixels is completely contained in a macroblock. A 16-pixel wide horizontal row across the image is decoded from a row of macroblocks. The bitstream decoder decodes one row of macroblocks at a time.

It may be noted that a typical monitor is interlaced, i.e. it displays first the odd lines of an image then the even lines of the image. The image data from a macroblock row is therefore normally used by the display processor eight lines at a time. To provide for this, the bitstream decoder stores the odd lines and even lines of the macroblock row in separate memory segments and provides these pointers separately to buffer 116.

Figure 3:
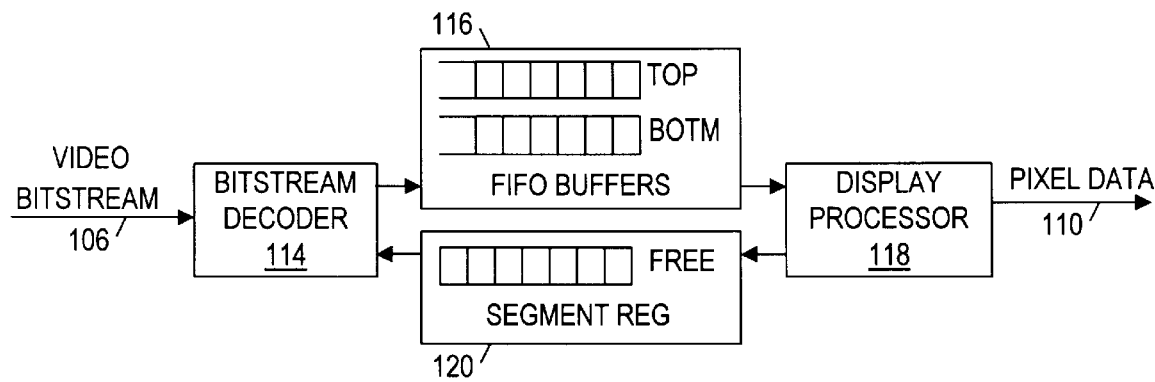
FIG. 3 illustrates the dynamic memory allocation architecture of a video decoder.

Turning now to FIG. 3, one embodiment of the dynamic memory allocation architecture of video decoder 100 is shown. Buffer 116 is shown as two parallel buffers, a top buffer and a bottom buffer. After bitstream decoder 114 has decoded a macroblock row and stored the image data for the odd lines in a first segment and stored the image data for the even lines in a second segment, it stores a pointer to the first segment in the top buffer and a pointer to the second segment in the bottom buffer. The display processor can then retrieve pointers from the top buffer when it needs image data for the top field and retrieve pointers from the bottom buffer when it needs image data for the bottom field.

In the embodiment shown in FIG. 3, the segment register 120 is depicted as a bit register, with the number of bits equal to the number of segments in the third region of memory 102. Each bit corresponds to a memory segment, and is set to "0" if the segment is allocated and "1" if the segment is available. Other methods for maintaining a list of de-allocated memory segments may also be used, including FIFO buffers and sorted or linked lists.

Figure 4:
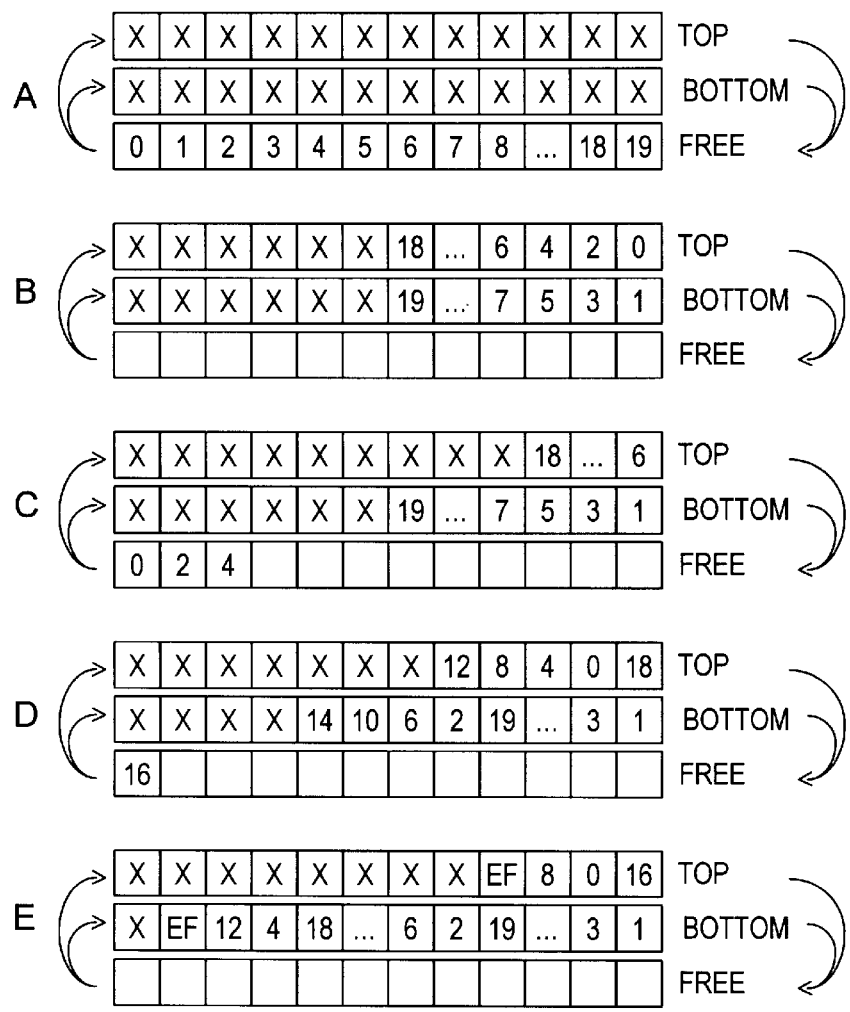
FIG. 4 provides a detailed block diagram of the dynamic memory allocation portion of a video decoder.

Turning now to FIG. 4, a dynamic memory allocation example is provided. Situation A is an initial condition which occurs during decoding and display of anchor frames. Decoding and display of anchor frames uses the first and second regions of memory 102, and the third region of memory 102 is entirely free, as indicated by the list of segments in the free segment register. For the purposes of discussion, 20 memory segments are assumed, although a larger or smaller number may also be used.

As bitstream decoder 114 begins decoding a B frame, it takes two free memory segments at a time and decodes a complete macroblock row, placing the decoded even lines of the macroblock row into one segment and the decoded odd lines of the macroblock row into the other segment. Once the macroblock row is completely decoded, pointers to the memory segments are placed into the FIFO buffers, and a new pair of segments is obtained for the next macroblock row. Pointers to the segments containing the even lines are placed in the top FIFO buffer, and pointers to the segments containing the odd lines are placed in the bottom FIFO buffer. After the bitstream decoder has decoded 10 macroblock rows, the configuration shown in situation B is obtained. Since there are no more free segments, the bitstream decoder stalls until image data from the memory segments is displayed and the memory segments de-allocated.

After display of the anchor frame is complete, display processor 118 begins displaying the even lines of the B frame, freeing the memory segments as it does so. After the even lines of three macroblock rows have been scanned, situation C is obtained. With free memory segments available, bitstream decoder 114 again begins decoding. After the even lines of 9 macroblock rows have been scanned, situation D is obtained. Note that the free memory segments are being re-used as they become available in pairs. After the even lines of 14 macroblock rows have been scanned, situation E is obtained. Note that although the third region of memory is typically not large enough to contain an entire image frame, it is at least large enough to hold an entire image field. The bitstream decoder has completed the decoding of a frame and placed end-of-field tokens in the FIFO to mark the end of the image field. When display processor 118 detects these end-of-field tokens, it begins a new scan.

Usage of the end-of-field tokens allows the decoder to begin decoding the next image frame while display of the current frame continues. While this can be done without using the end-of-field tokens, those techniques require a pre-determination of image size or a more complex algorithm for setting the size of the current image. The end-of-field tokens allow for variable image sizes in a efficient manner.

It may not be uncommon for the decoded image size to be different from the displayed image size, particularly in the vertical dimension. If this occurs without the usage of end-of-field tokens, the display processor may display the beginning of the next image at the bottom of the screen for the current image if the current image is too short. Conversely, if the current image is too tall, the bottom of the current image may be displayed at the top of the screen for the next image. In either case, this loss of synchronization leads to undesirable visual effects. When the end-of-field tokens are used, if the current image is too short, the display processor encounters the end-of-field token before the display of the current image field is complete and "fills-in" the remainder of the image field, preferably with blank lines. If the current image is too tall, the display processor completes the display of an image field without encountering an end-of-field token. The display processor then scans through the FIFO buffer, de-allocating memory segments until the end-of-field token is encountered, in essence "discarding" the portion of the image field which doesn't fit onto the display.

Under adverse decoding circumstances, it may be possible for the display decoder to get behind, i.e. the display processor is attempting to display data which has not yet been decoded. This error condition is sometimes known as "tearing". To provide a method for gracefully recovering from this error condition, the logic circuitry for the FIFO buffers 116 includes a counter for each buffer which tracks the number of segments that bitstream decoder 114 is ahead of display processor 118. Under normal operating conditions, the bitstream decoder 114 increments the counter each time it provides a pointer to the corresponding FIFO buffer, and the display processor 118 decrements the counter each time it retrieves a pointer from the corresponding FIFO buffer. When the display processor 118 gets ahead of the bitstream decoder 116, the counter holds a negative value. Under these circumstances, the bitstream decoder 116 increments the counter every time the image data is decoded and the decoder is ready to provide a pointer to the corresponding FIFO buffer. Similarly, the display processor 118 decrements the counter every time it is ready to retrieve a pointer from the corresponding FIFO buffer to access image data for display. Note, however, that the pointer is not actually provided to (or retrieved from) the buffer because it is too late—the display processor 118 has already substituted for the missing image data. In this manner, synchronization is maintained between the bitstream decoder and display processor so that when the bitstream decoder does catch up (by cheating if necessary—the bitstream decoder may be configured to skip decoding steps for image data that won't be displayed), the image data is displayed at the proper display position on monitor 6.

The end of an image field presents a special case for synchronization. Use of the synchronization counter does not by itself maintain synchronization across a field boundary. If the bitstream decoder encounters the end of an image field while the synchronization counter is negative and before the display processor reaches the end of a display field, it resets the counter and writes an end-of-field token to the FIFO buffer. If the display processor reaches the end of a display field while the counter is negative, it resets the synchronization counter and sets a late flag associated with the FIFO buffer. Then, as before, it decrements the synchronization counter for each pointer it is ready to retrieve. The bitstream decoder does not increment the synchronization counter while the late flag is set, and the bitstream decoder resets the late flag whenever it reaches the end of the image field. In this case, an end-of-field token is not provided to the FIFO buffer for which the late flag was set.

In this manner, synchronization is maintained between the bitstream decoder and display processor, even should the bitstream decoder get up to a full frame behind the display processor. This advantageously allows the display processor to begin displaying the decoded image information in the correct display position when the bitstream decoder recovers from the error condition.

Figure 5:
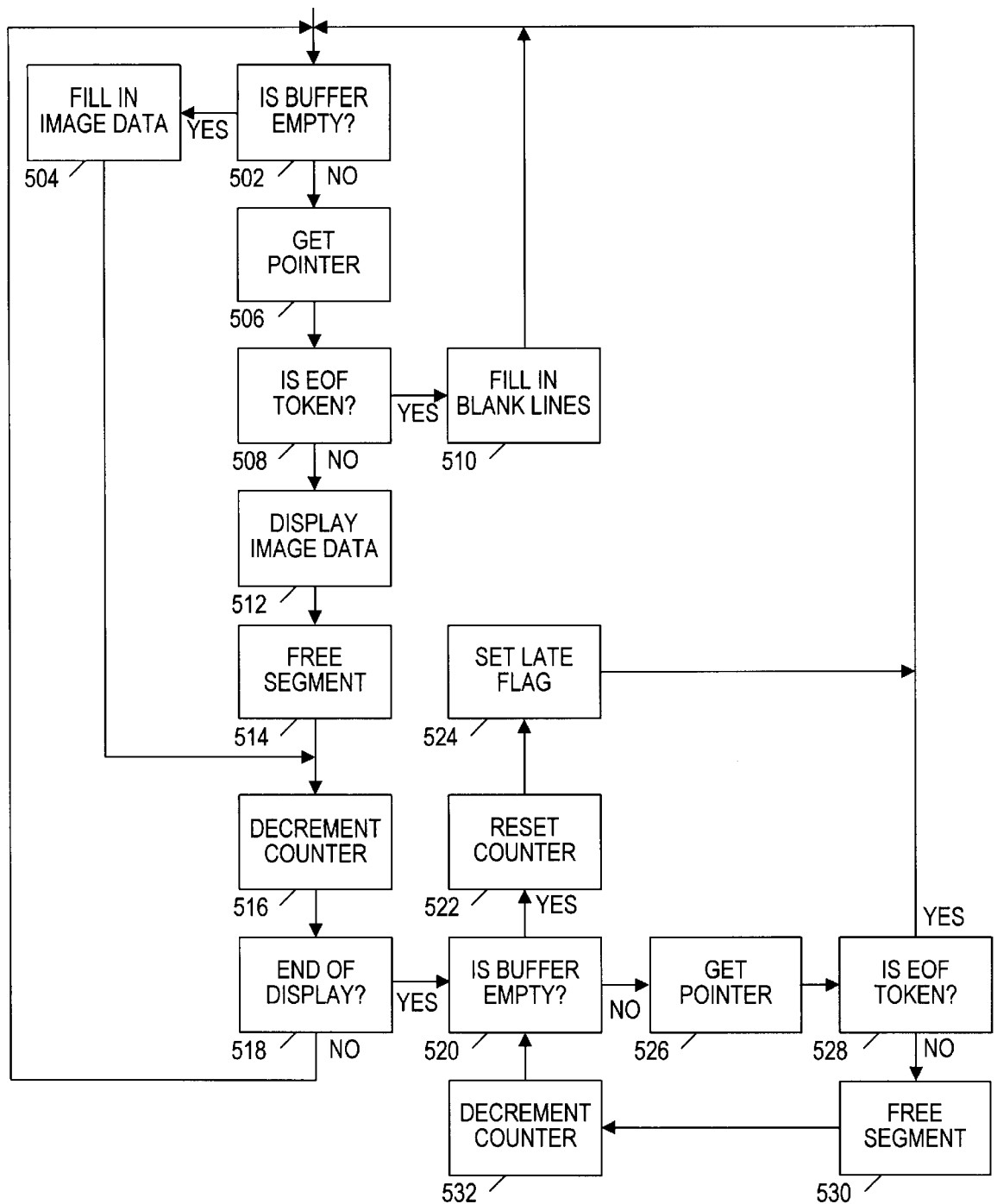
FIG. 5 illustrates the operation of a FIFO buffer.

Turning to FIG. 5, a flowchart illustrates the synchronization method that the display processor is configured to implement. In step 502 the display processor checks to see if the FIFO buffer is empty. If it is, in step 504 the display processor substitutes for the missing image data, and control passes to step 516. If the buffer is not empty, in step 506 the display processor retrieves a pointer from the FIFO buffer, then in step 508 determines if the pointer is and end-of-field token. If an end-of-field token is encountered, in step 510 the display processor fills in blank lines until the end of the display field is reached, then returns to step 502 to begin a new image field. If the pointer was not an end-of-field token, in step 512 the display processor uses the pointer to access image data in the corresponding memory segment and displays the image data. Subsequently, the display processor frees the memory segment in step 514 and decrements the synchronization counter in step 516. In step 518, the display processor determines if the end of the display field has been reached, and if not, control returns to step 502. If the end of the display field has been reached, then in step 520, the display processor determines if the FIFO buffer is empty. If the FIFO buffer is empty, in step 522 the display processor resets the synchronization counter and sets the late flag in step 524. Control then returns to step 502 to begin a new image field. If the buffer is not empty in step 520, then in step 526, the display processor retrieves a pointer and in step 528 determines if the pointer is an end-of-field token. If it is, then control returns to step 502 to begin a new image field. If the pointer is not an end-of-field token, in step 530 the display processor frees the memory segment and in step 532 decrements the synchronization counter. Control then returns to step 520.

Figure 6:
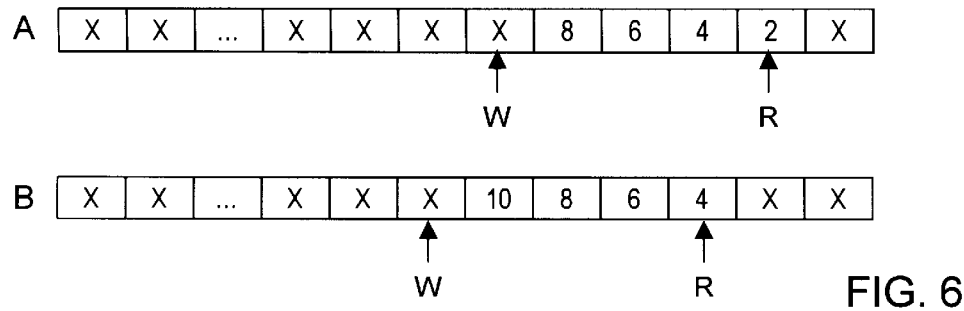
FIG. 6 illustrates the use of EOF tokens for decoder-display synchronization.

Turning to FIG. 6, a first embodiment of the FIFO buffer is illustrated. The FIFO buffer is implemented in an array of memory elements. A write pointer "W" is used to indicate the next element that is available for receiving a memory segment pointer. A read pointer "R" is used to indicate the next element from which a memory segment pointer is to be retrieved. In situation A, the FIFO buffer is shown containing four memory segment pointers. Invalid pointers are indicated by an "X". A memory segment pointer retrieval operation causes the read pointer to increment, and the retrieved memory segment pointer is considered to be replaced with an invalid pointer, since the memory segment is to be de-allocated after the display processor retrieves all the image data. A memory segment pointer write operation replaces an invalid pointer with the written memory segment pointer, and the write pointer increments. Note that the increments are performed in a circular fashion, i.e. the pointers "wrap around" to the first element when incremented past the end of the array of memory elements. Situation B shows the FIFO buffer after a memory segment pointer write operation and a memory segment pointer retrieval operation have been executed.

Figure 7:
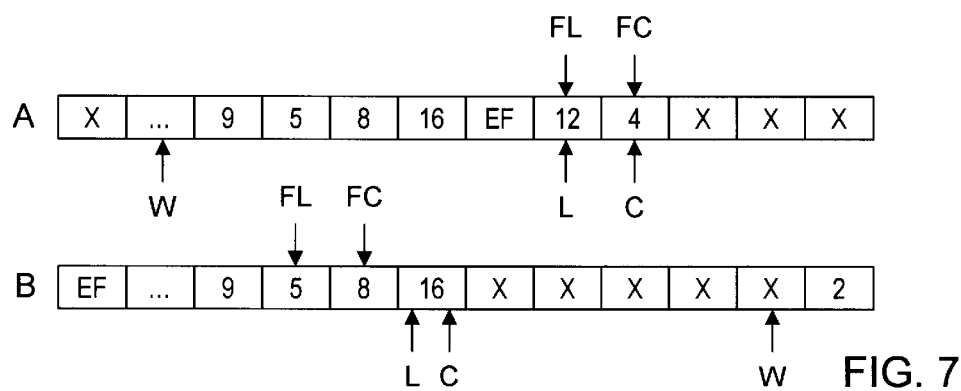
FIG. 7 illustrates the use of freeze pointers for providing a field freeze function.

The memory segments each contain a macroblock row, and each macroblock contains both brightness (luma) and color (chroma) data. These data are processed by different pipelines in the display processor, possibly at different speeds. To circumvent the necessity for extra memory buffers in the display processor, separate read pointers can be used for the luma and chroma pipelines. Turning to FIG. 7, a second embodiment of the FIFO buffer is illustrated. As before, a write pointer "W" indicates the next element available to receive a memory segment pointer. In this embodiment, a luma read pointer "L" indicates the next element from which a memory segment pointer is to be retrieved by the luma pipeline, and a chroma read pointer "C" indicates the next element from which a memory segment pointer is to be retrieved by the chroma pipeline. A luma-read operation (memory segment pointer retrieval by the luma pipeline) causes the luma read pointer to increment, and if it is behind the chroma read pointer (i.e. the memory segment pointer has already been retrieved by the chroma pipeline) the retrieved memory segment pointer is considered to be replaced with an invalid pointer. Similarly, a chroma-read operation causes the chroma read pointer to increment, and if it is behind the luma read pointer, the retrieved memory segment pointer is considered to be replaced with an invalid pointer. Situation A shows the FIFO buffer containing six memory segment pointers and an end-of-field token. The luma read pointer leads the chroma read pointer in this instance.

In the embodiment of FIG. 7, a provision is also made for a freeze mode. A freeze-mode chroma read pointer FC and a freeze mode luma read pointer FL are used. During normal operation, FC and FL are equal to C and L, respectively. This is shown in situation A. When an end-of-field token is encountered, a check is made to determine if freeze mode is desired. In freeze mode, the luma read and chroma read pointers are "frozen" on the first memory segment pointer of an image field. The FC and FL pointers act as the chroma read and luma read pointers while the freeze mode is active. Memory segments are not de-allocated, and the memory segment pointers are not considered to be replaced by invalid pointers after they are retrieved by the luma and chroma pipelines. After each chroma read operation, the FC pointer is incremented, and after each luma read operation, the FL pointer is incremented. When an end-of-field token is retrieved in freeze mode, the read pointer used to retrieve it is repositioned at the memory segment pointer indicated by the frozen L and C pointers. In situation B, the FIFO buffer is operating in freeze mode. The L and C pointers are frozen on the first memory segment pointer of an image field, and the FL and FC pointers are being used for memory segment pointer retrieval operations. When the FL and FC pointers encounter the end-of-field token, they will be repositioned at the memory element indicated by the frozen L and C pointers. Write operations to the FIFO buffer continue as long as buffer space is available and free memory segments exist. Note that the write pointer W has "wrapped around" the end of the FIFO buffer.

When the end-of-field token is encountered, and the FL and FC pointers are repositioned, a determination is made whether the freeze mode is still in effect or not. If not, then the L and C pointers are unfrozen, and the FIFO buffer returns to normal operation.

Figure 8:
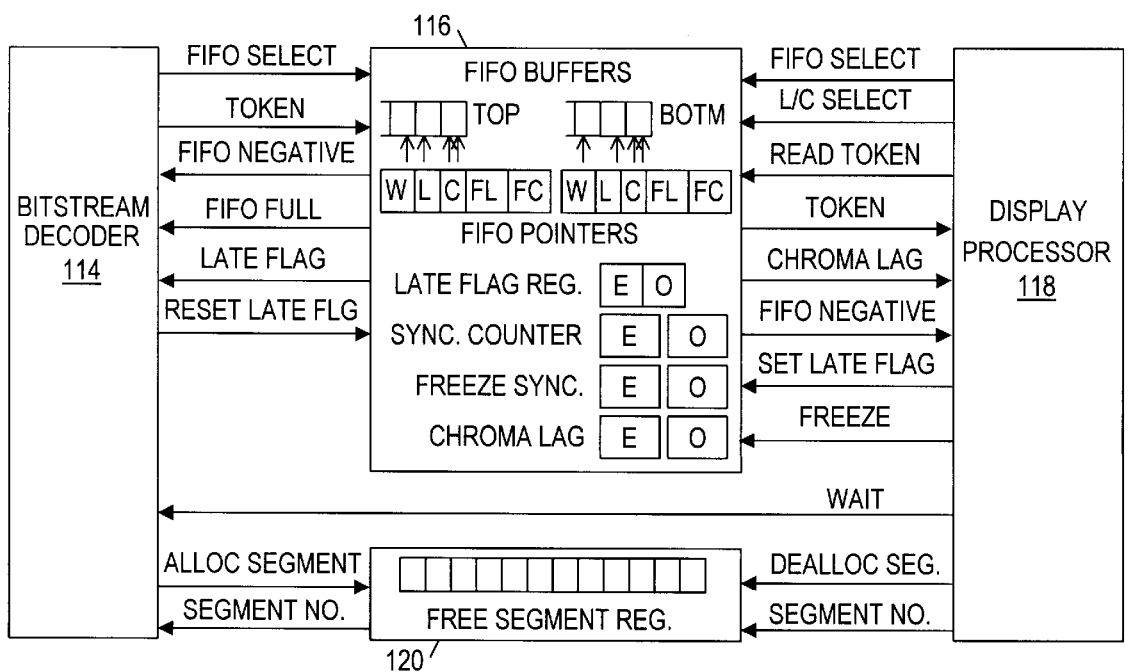

Turning now to FIG. 8, a specific embodiment of the system having the previously described aspects is shown. A multiplicity of signals and logic is used to implement the dynamic memory allocation scheme efficiently. The FIFO buffer logic block 116 includes two memory arrays for top and bottom fields. To use these memory arrays as FIFO buffers, the buffer logic block includes a set of read and write pointers for each memory array. Each set of read and write pointers includes a write pointer W, a luma read pointer L, a chroma read pointer C, a freeze mode luma read pointer FL, and a freeze mode chroma read pointer FC. The buffer logic block includes a register which holds a late flag for each buffer, and also includes a synchronization counter for each buffer. A freeze synchronization counter is included to provide for synchronization in freeze mode. Finally, a chroma lag counter is included.

The chroma lag counter is used as an indicator to the luma and chroma pipelines for memory segment de-allocation. If the chroma lag count is negative, the luma pipeline de-allocates the current memory segment retrieving a new memory segment pointer and incrementing the chroma lag counter. Similarly, if the chroma lag count is positive, the chroma pipeline de-allocates the current memory segment before retrieving a new memory segment pointer and decrementing the chroma lag counter. In freeze mode, the memory segments are not de-allocated.

The bitstream decoder 114 obtains a pair of memory segment pointers from free segment register 120 by asserting an allocate segment signal. Free segment register 120 replies with a segment number signal specifying a pair of pointers to memory segments if a pair is available. Bitstream decoder decodes image data and stores it in the memory segments indicated by the memory segment pointers. Buffer logic block 116 provides a FIFO negative signal, a FIFO full signal, and a late flag signal to bitstream decoder 114. The FIFO negative signal is used to indicate if the bitstream decoder is behind the display processor, the FIFO full signal is used to indicate if the buffers can accept more memory segment pointers, and the late flag signal is used to indicate if the display processor has asserted a late flag signal. Bitstream decoder 114 provides a FIFO select signal, a token signal, and a reset late flag signal to buffer logic 116. The FIFO select signal is used to indicate the target FIFO buffer for the token signal. The token signal communicates a token having a memory segment pointer or an end-of-field marker. The reset late flag signal causes the appropriate late flag to be reset in the buffer logic 116.

The display processor 118 provides a FIFO select signal, a luma/chroma select signal, a read token signal, a set late flag signal, and a freeze mode signal to buffer logic 116. The FIFO select signal is used to select a FIFO from which a token will be retrieved, the luma/chroma select signal selects either the current luma token or the current chroma token of the selected FIFO, the read token signal triggers the retrieval of a token, the set late flag signal sets a late flag in the late flag register, and the freeze mode signal indicates if the freeze mode is active. The buffer logic 116 provides a token signal, a chroma lag signal, and a FIFO negative signal to the display processor 118. The token signal is communicates a token having a memory segment pointer or an end-of-field marker, the chroma lag signal indicates if the chroma read pointer is behind the luma read pointer, and the FIFO negative signal indicates if the display processor is ahead of the bitstream decoder. The display processor 118 provides a de-allocate segment signal and a segment number signal to the free segment register 120. The de-allocate segment signal triggers a de-allocation of a memory segment, and the segment number signal communicates a pointer to the memory segment which is to be de-allocated.

The present invention also contemplates embodiments where the architecture of the present invention is used for the production of other visual effects, such as 3:2 pulldown. The present invention may also be used in other video codecs which do not adhere to the MPEG 2 standard, but which are substantially similar.

Numerous variations and modifications will become apparent to those skilled in the art once the above disclosure is fully appreciated. It is intended that the following claims be interpreted to embrace all such variations and modifications.

What is claimed is:

1. A video decoder comprising:
   a segment register configured to indicate de-allocated memory segments;
   a bitstream decoder coupled to the segment register to determine target memory segments, configured to receive a bitstream, configured to convert the bitstream into image data, and configured to write said image data into said target memory segments;
   a FIFO (first-in-first-out) buffer coupled to the bitstream decoder to receive pointers to said target memory segments;
   a display processor coupled to retrieve said pointers from the FIFO buffer, configured to read said image data from said target memory segments, configured to convert said image data into a stream of pixel data, and coupled to the segment register to de-allocate said target memory segments;
   wherein the bitstream decoder is configured to provide an EOF (end-of-field) token to the FIFO buffer to mark an end to the image data for a field.

2. The video decoder of claim 1, wherein when the display processor determines that an end of a display field has been reached without encountering an EOF token, the display processor is configured to retrieve pointers and de-allocate target memory segments until an EOF token is encountered.

3. The video decoder of claim 1, wherein when the display processor encounters an EOF token before reaching an end of a display field, the display processor is configured to fill in blank lines until the end of the display field is reached.

4. The video decoder of claim 2, wherein said FIFO buffer is dedicated to pointers for target memory segments which store image data for bottom image fields, wherein the video decoder further comprises a second FIFO coupled to the bitstream decoder to receive pointers to target memory segments which store image data for top image fields, and wherein the display processor is coupled to retrieve pointers from the second FIFO buffer.

5. A video display system comprising:
   a video monitor configured to display an image by scanning a raster signal;
   a rasterizer coupled to provide the raster signal to the video monitor in response to a stream of pixel data;
   a memory configured to store image data in memory segments;
   a video decoder configured to receive a bitstream and configured to convert the bitstream into said stream of pixel data, wherein the video decoder includes:
      a segment register configured to indicate de-allocated segments in said memory;

a bitstream decoder coupled to the segment register to determine target memory segments, configured to receive the bitstream, configured to convert the bitstream into image data, and coupled to the memory to write said image data into said target memory segments;

a FIFO (first-in-first-out) buffer coupled to the bitstream decoder to receive pointers to said target memory segments;

a display processor coupled to retrieve said pointers from the FIFO buffer, coupled to said memory to read said image data from said target memory segments, configured to convert said image data into said stream of pixel data, and coupled to the segment register to de-allocate said target memory segments;

wherein the bitstream decoder is configured to provide an EOF (end-of-field) token to the FIFO buffer to mark an end to the image data for a field.

6. The video display system of claim 5, wherein when the display processor determines that an end of a display field has been reached without encountering an EOF token, the display processor is configured to retrieve pointers and de-allocate target memory segments until an EOF token is encountered.

7. The video display system of claim 5, wherein when the display processor encounters an EOF token before an end of a display field is reached, the display processor is configured to fill in blank lines until the end of the display field is reached.

8. The video display system of claim 6, wherein said FIFO buffer is dedicated to pointers for target memory segments which store image data for bottom image fields, wherein the video decoder further comprises a second FIFO coupled to the bitstream decoder to receive pointers to target memory segments which store image data for top image fields, and wherein the display processor is coupled to retrieve pointers from the second FIFO buffer.

9. A method for displaying an image having a first image height on a monitor having a second image height, wherein the method comprises a video decoder:

accessing a segment register to determine a target memory segment;

storing image data in said target memory segment;

providing a pointer to said target memory segment to a buffer; and placing an end-of-field token in said buffer if said image data completes the image.

10. The method of claim 9, further comprising a display processor:

checking for an end-of-field token at an output of said buffer;

generating pixel data representing blank lines for display on the monitor if an end-of-field token is found before the second image height has been traversed on the monitor;

retrieving a pointer from said buffer;

reading image data from a target memory segment;

converting image data to pixel data for display on the monitor;

writing to said segment register to de-allocate a target memory segment;

determining if the second image height has been traversed on the monitor; and if the second image height has been traversed, repeating said retrieving and writing until an end-of-field token is found.

* * * * *